Nov. 12, 1940.    F. H. NADIG ET AL    2,221,600
ELECTROSTATIC VOLTMETER
Filed July 27, 1939    4 Sheets-Sheet 1

WITNESSES

INVENTORS
Francis H. Nadig
and Jacob Lloyd Bohn
BY
ATTORNEYS

Nov. 12, 1940.  F. H. NADIG ET AL  2,221,600
ELECTROSTATIC VOLTMETER
Filed July 27, 1939  4 Sheets—Sheet 2

WITNESSES
Geo. W. Naylor
A. L. Kitchin

INVENTORS
Francis H. Nadig
and Jacob Lloyd Bohn
BY
Munn, Anderson & Liddy
ATTORNEYS

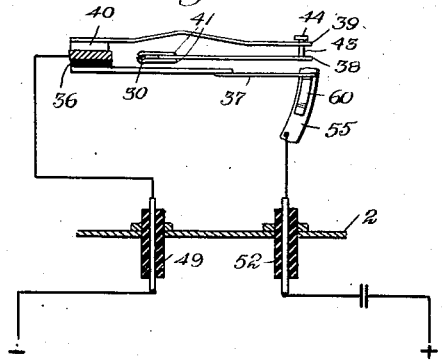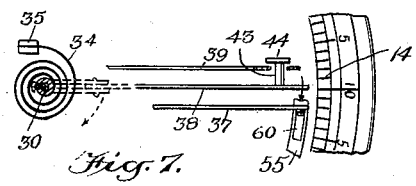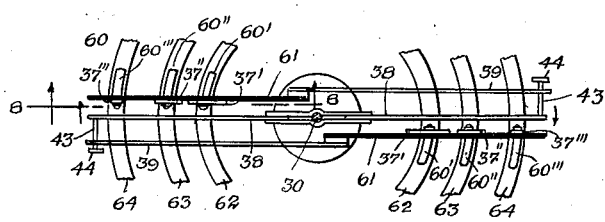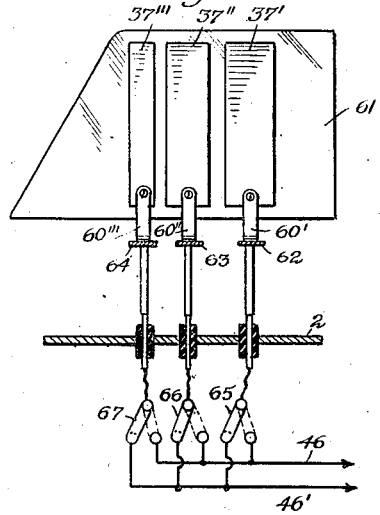

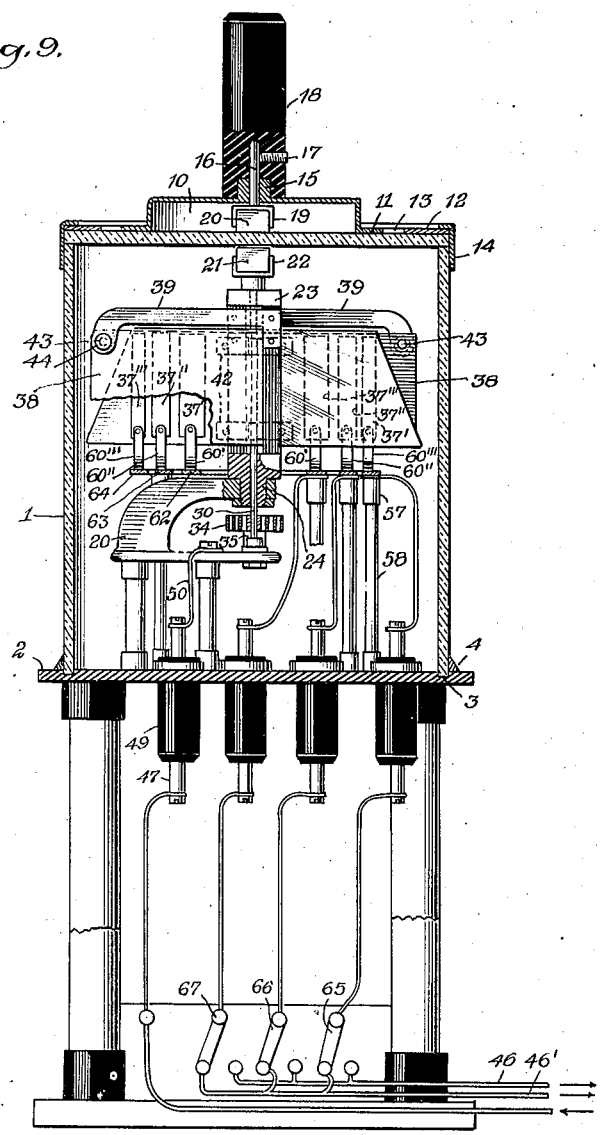

Patented Nov. 12, 1940

2,221,600

UNITED STATES PATENT OFFICE 2,221,600

ELECTROSTATIC VOLTMETER

Francis Henry Nadig, Philadelphia, and Jacob Lloyd Bohn, Glenside, Pa.

Application July 27, 1939, Serial No. 286,852

6 Claims. (Cl. 171—95)

This invention relates to an improved electrostatic voltmeter and has for an object to provide an improved construction wherein a large range of voltages may be measured with one instrument.

Another object of the invention is to provide an improved voltmeter formed so that it may be adjusted to measure small voltages and exceedingly high voltages.

In the accompanying drawings—

Fig. 5 is a diagram showing the circuit when the instrument is in use;

Fig. 6 is a fragmentary view illustrating the relative position and arrangement of the spring, scale and plates associated with the spring;

Fig. 7 is a plan view on a reduced scale showing a modified structure to that shown in Fig. 1;

Fig. 8 is a side view on a modified form of plate to that shown in Fig. 1;

Fig. 9 is a vertical sectional view similar to Fig. 2 but showing in one figure the structure illustrated in Figs. 5 to 8 inclusive.

Figures 1, 2:
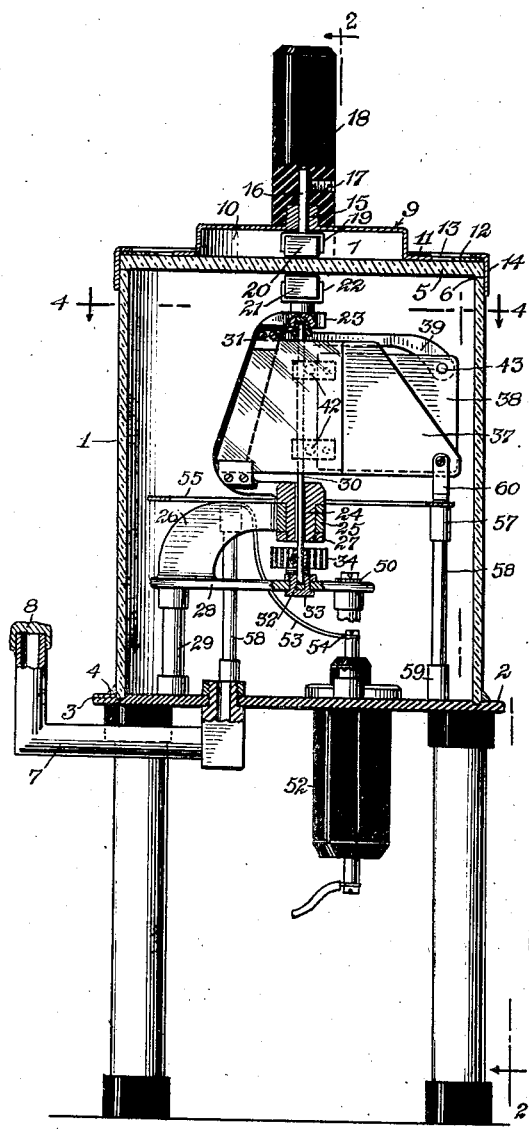
Fig. 1 is a longitudinal vertical sectional view through a voltmeter embodying the invention, the section being taken on the line 1—1 of Fig. 3.
Fig. 2 is a sectional view through Fig. 1 approximately on the line 2—2.

Referring to the accompanying drawings by numerals 1 indicates a tubular housing which is shown as being formed of glass though it could be made of other suitable material, as for instance, rubber, Bakelite or suitable vitreous material, or any other material which will hold a vacuum. The housing 1 rests on a bottom plate 2, which may be glass, rubber, metal, or other desired material, preferably formed with a groove 3 in which the lower end of housing 1 rests. A sealing structure 4, which may be wax or other suitable material, is applied at the juncture of housing 1 and plate 2 so as to make the parts airtight at this point. The top of the housing 1 is provided with a cover plate 5 of glass or other suitable material which is preferably transparent. The cover plate 5 is connected at 6 to the housing 1 by cement or other suitable material which will permit a vacuum to be maintained in housing 1. A pipe 7 is connected to the bottom plate 2, as shown in Fig. 1, and to this pipe a suction or rarefaction pump is connected when it is desired to evacuate the air from housing 1. Preferably a high degree of rarefaction is secured and then a suitable sealing member 8 applied to pipe 7. The apparatus will operate at different air pressures, but where a high voltage is to be used, as for instance, 50,000 volts, a high degree of vacuum is necessary to prevent sparking and short-circuiting of the current.

Figure 3:
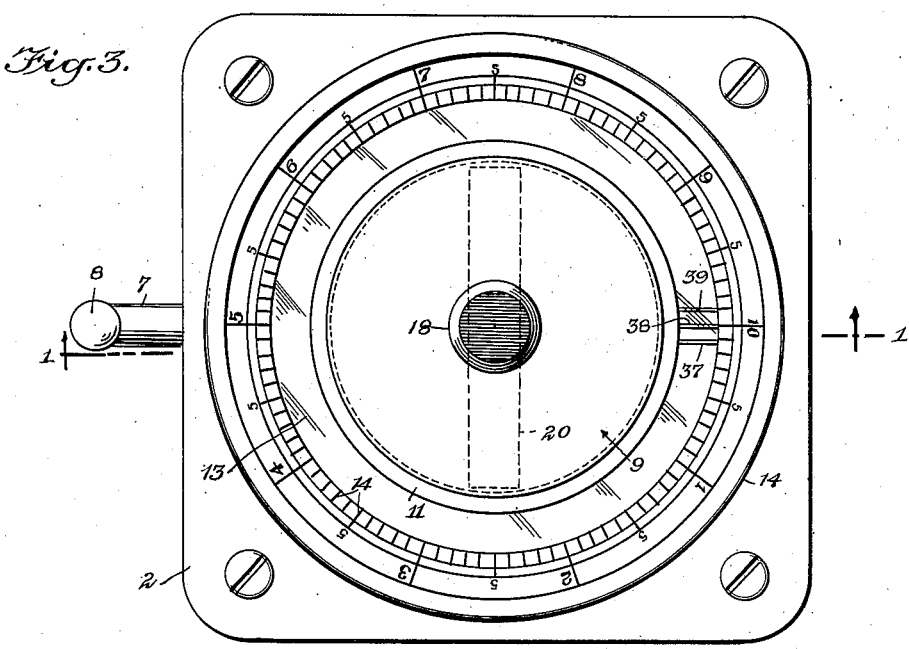
Fig. 3 is a top plan view on an enlarged scale of the voltmeter shown in Fig. 1.

Arranged on top of the cover plate 5 is a covering member 9, preferably of metal, and forming a chamber 10 from which a flange 11 radiates but falls short of the periphery of the plate 5. An annular strip 12 extends from the periphery of plate 5 inwardly but leaves an uncovered space 13, whereby any one may look through this space and see through the plate 5. The annular strip 12 is provided with graduations as shown in Fig. 3. An L-shaped member 14 overlaps part of the housing 1 and part of the strip 12 for holding the strip in place, which strip 12 is preferably cemented or otherwise rigidly secured to the plate 5. If desired, the flange 14 could be cemented to plate 5 though this is not essential. Member 9, at the center, is provided with an apertured enlargement 15 through which the shaft 16 extends so that a set screw 17 may firmly clamp the shaft to a handle 18 which is made of rubber or other suitable insulating material. The shaft 16 is preferably metal and has a U-shaped member or yoke 19 at the lower edge frictionally engaging a permanent magnet 20, which is preferably rectangular in shape and which extends, as indicated in dotted lines in Fig. 3, almost across the chamber 10. Whenever handle 18 is rotated, magnet 20 will be rotated. The magnet 20 is adapted to attract a second magnet 21 held by a yoke 22 and cause the same to rotate. Yoke 22 is rigidly secured to a U-shaped frame 23 which has an apertured lower protuberance 24 extending rotatably through the enlarged end 25 of a bracket 26. A nut 27 is connected with the extension 24 to hold the same in place while permitting the same to freely rotate. Whenever magnet 20 rotates magnet 21, the frame 23 and protuberance or extension 24 will also rotate. Bracket 26 is formed integrally with or rigidly secured to a metal base plate 28. This base plate is supported by a plurality of glass posts 29, though other insulating supports could be used. A small shaft 30 is rotatably mounted at 31 in a suitable bearing threaded into the bracket 23, and at 32 is rotatably mounted in a bearing 33 threaded into the base 28. A coil spring 34 has one end rigidly secured to shaft 30 and the other end secured to a block 35 carried by the base plate 28. Preferably the spring 34 tapers from one end to the other though it could be made gradually thinner from one end to the other. The spring is preferably the thinnest and narrowest at the point secured to the shaft 30 and evenly increases in width or thickness, or both, to the end secured to the lug 35. This causes the spring 34 to increase in resistance approximately with the square of the angular motion of the axis of shaft 30.

Figure 4:
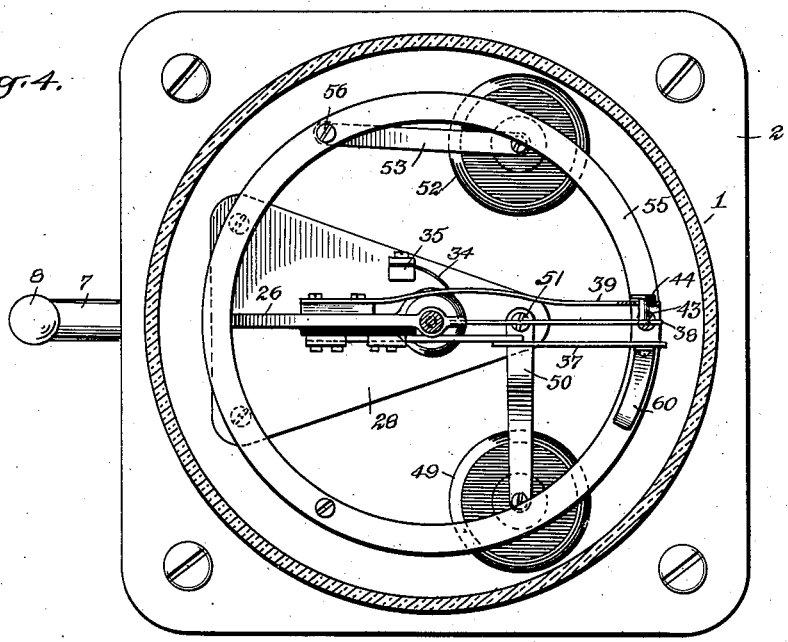
Fig. 4 is a sectional view on an enlarged scale through Fig. 1 approximaely on the line 4—4.

As shown particularly in Fig. 5, the U-shaped frame 23 has a strip of insulation 36 on one side and to this insulation is secured a plate 37 which coacts with plates 38 and 39 to secure certain results hereinafter fully described. Plate 39 may be the same size as plate 37, or may be merely an arm as indicated particularly in Fig. 1. This plate is of metal and is secured at 40 in any desired manner, as for instance, by screws, to yoke 23. Plate 38 has a pair of clamping plates 41 connected thereto which clamp the shaft 30. Preferably clamping screws 42 are used to secure a firm clamping action so that plate 38 will always swing with shaft 30. Preferably this plate and shaft swing freely. A pin 43 is rigidly secured to plate 38 and extends loosely through an aperture in plate 39 but is prevented from disengagement from the plate or arm 39 by an enlarged head 44. When all the parts are free and there is no influence on the apparatus, plate 38 may freely swing toward and from the plate 39, but when the plate or arm 39 is charged with current plate 38 will be charged with the same current and both will either be positive or negative so that they will repulse each other and, consequently, plate 38 will remain substantially as shown in Fig. 5 with respect to the arm or plate 39. When this occurs, the plate 37 is charged with the opposite polarity and, consequently, plate 38 will be pushed and pulled in a clockwise direction as illustrated in Figs. 4 and 5. Lead-in wires 45 and 46 are connected to the respective terminals 47 and 48, as shown in Fig. 2. Terminal 47 extends into an insulating member 49 secured in any desired manner to the bottom 2 and extends therethrough but in such a way as not to disturb the vacuum within housing 1. The upper end of terminal 47 is connected with a flexible conductor 50 which is secured at 51 (Fig. 4) to base 28 by any suitable means, as for instance, a screw. The terminal 48 extends through an insulating block 52 constructed similar to block 49 so that the conductor 53, which may be a flat strip of sheet metal, may be rigidly secured thereto, as shown by screw 54. The opposite end of the conductor 53 is secured to a contact ring 55 in any suitable way, as for instance, by a screw 56, which screw also extends into one of two tubular bosses 57. As shown in the drawings there are three tubular bosses and each boss carries an insulating post 58 of glass or other suitable material. These posts fit into bosses 59 secured in any desired manner to the bottom 2. This provides a proper support for the contact ring 55 so that it will remain in place as the resilient metal brush 60 moves thereover. Current entering through the conductor 50 will charge plates 38 and 39 and current entering through conductor 53 will charge plate 37. The area of plates 37 and 38 may be the same or they may vary in size in any desired manner and the same is true with respect to the plate or arm 39. In case the plates 38 and 39 are connected to the negative side of the circuit there is a negative charge on both plates and since plate 38 can rotate independently of plate 39 within certain limits, plate 38 will be repelled by plate 39 and thus cause a torque on the mechanical axis of plate 38. When plates 38 and 39 are negative plate 37 will be connected to the positive terminal of the voltage and will receive a positive charge. By reason of this fact, plate 37 will attract plate 38 and cause an additional torque on the axis of plate 38 in the same direction as the previous torque. The magnitude of this total torque increases with the square of the voltage used. It will be understood that voltages may be measured from 2,000 or 3,000 up to possibly 100,000 volts by a single apparatus as disclosed in the accompanying drawings. It will also be evident that there will be a torque on the axis of plate 38 if plate 39 is removed or electrically disconnected from plate 38, but this torque will not be as great as when plate 39 is electrically active. When the metallic plate 39 is removed an arm or plate of insulating material must be substituted to cause the pin 43 to function.

It will, of course, be understood that the polarity of the voltage may be reversed without affecting the mechanical action. Also one terminal of the voltage to be measured may be at earth potential and a torque on plate 38 will still be present. If plates 38 and 39 are connected to the earth terminal, the force will occur chiefly between plates 37 and 38 and plate 39 will now be rather ineffective in so far as producing torque is concerned.

From Figs. 1 and 4 it will be seen that the spring 34 is attached firmly to the lug 35 and to the shaft 30. As electrostatic forces move plate 38 in a clockwise direction spiral spring 34 will exert a torque on plate 38 in a counterclockwise direction. As the clockwise torque due to the electrostatic force on plate 38, is greater than the counterclockwise torque due to the spring 34, the pin or button 43 will be forced against plate 39. Under these circumstances if plates 37 and 39 are rotated in a clockwise direction by actuating the handle or knob 18, then plate 38 will also rotate due to electrostatic forces from applied voltage. As plate 38 rotated clockwise spring 34 "winds up" and this produces an ever-increasing counterclockwise torque on the axis of plate 38. When plates 37, 38 and 39 have turned sufficiently far, the counterclockwise torque on plate 38, due to the action of spring 34, will become equal to or slightly greater than the clockwise torque due to the electrostatic force. At this point plate 38 will be forced against plate 39. By looking through the panel or space 13 in the cover plate 5, the position of plate 37 may be observed in respect to the scale 14. Scale 14 presents a direct reading for indicating the voltage. As an example, the largest graduations on the scale, as shown in Fig. 3, might indicate a thousand volts in each graduation so that one revolution of plate 38 would indicate 10,000 volts and six revolutions would indicate 60,000 volts. The scale 14 may be plotted or formed in any desired manner. As for instance, the position of plate 37 may be observed for a given voltage which has been previously determined by some method, as for example, with a high resistance and a milliammeter. In this way a series of readings R is observed for a series of voltages V covering the entire range of the instrument. A curve is now plotted using R as abscissae and V as ordinates. With the aid of this curve (calibration curve), the graduations or calibrations 14 have been applied directly to the instrument so as to give a direct reading of the voltages measured. Where very low voltages are used the housing 1 may be filled with air or a vacuum, but where high voltages are to be measured the housing 1 must be evacuated as much as possible.

As shown particularly in Figs. 1 and 2, magnet 20 is exterior of the top plate 5, while magnet 21 is interior thereof and is connected with the moving parts of the apparatus. When the knob or handle 18 is rotated the moving parts interior of the housing will be moved as magnet 21 will move with magnet 20.

Since the torque on shaft 30 increases as the square of the voltage of the plates and since it is desirable to have the restoring torque due to spring 34 increase in such a way that the angular motion of the axis of the shaft 30 is approximately proportional to the voltage, spring 34 is constructed so that the restoring force increases approximately with the square of the angular motion of the shaft 30. For this purpose, the spring 34 is made tapering as heretofore described.

Instead of having one plate 37, a group of plates could be provided, as shown in Fig. 8. In this form of the invention, a supporting plate 61, preferably of insulating material, is mounted in a similar manner to plate 37 in Fig. 1 and on plate 61 are arranged metal plates 37', 37'' and 37''' insulated from each other. Each of these plates is connected by spring brushes 60', 60'' and 60''' to the respective contact rings 62, 63 and 64 which may be connected individually to a lead-in wire 46 or individually through the use of the respective switches 65, 66 and 67. In this form of the invention, a double plate structure 38 is used, which is adapted to coact with all of the plates 37' to 37'''. By properly using all or any group of plates, various high voltages may be measured easily. Aside from the parts just described, the construction is identical with that shown in Fig. 1 and will, therefore, need no additional description.

In testing a static machine or any other voltage producing machine, wires 45 and 46 are connected to the apparatus to be tested and the plate 37 is preferably turned to 0, which is the same as the numeral 10 on the scale in Fig. 3. The voltage is then switched on and immediately the plates 37, 38 and 39 will be charged with a certain potential. Knob or handle 8 is then turned clockwise. If plate 39 catches up with plate 38, for instance at the graduation 9, it would mean that 9,000 volts were being impressed on the instrument. If two complete revolutions were made before the arm caught up with plate 38, it would indicate that 20,000 volts were impressed on the instrument. If five revolutions were made it would mean that 50,000 volts were being impressed on the instrument. The greater the voltage impressed on the instrument, the greater the attraction and repulsion of the respective plates 37, 38 and 39. In view of this fact a sufficient number of revolutions must be made to wind spring 34 sufficiently to counterbalance or overcome the torque produced by the electrostatic forces. If the spring 34 is constructed to permit seven rotations of knob 18, only five or six rotations should be made to get an accurate reading. However, if spring 34 is capable of permitting fifteen revolutions of knob 18, ten or more revolutions could be made and at each revolution the countertorque of the spring increases so that eventually it will balance the torque of the electrostatic forces. Under these circumstances, if ten revolutions were made it would indicate that 100,000 volts were being impressed on the instrument.

It will be evident that the instrument may be used to measure constant, fluctuating or alternating voltages. It is also evident that the instrument may be made of various sizes without departing from the spirit of the invention. In connection with the leading wire 46, there is provided a condenser 46'. The voltmeter embodying the invention indicates the voltage across its terminals. If a condenser is connected in series with it, and since the instrument behaves as a condenser, only part of the total voltage to be measured will be across the terminals of the voltmeter. Thus by connecting a condenser having a capacity equal to the capacity of the voltmeter, there would be equal voltages across the condenser and the voltmeter. The total voltage would then be twice that indicated by the voltmeter, making it possible to read voltages twice as great as those for which the instrument was constructed. A condenser thus used would be called a multiplier.

We claim:

1. An electrostatic voltmeter including a housing having a transparent top, means on said top presenting an annular scale calibrated in volts, means mounted on said top forming a chamber, a magnet arranged in said chamber, a handle connected with said magnet for rotating the same, a coacting magnet arranged interiorly of the housing adapted to be rotated by the first-mentioned magnet, a substantially U-shaped frame carrying the second-mentioned magnet, said frame having an apertured bearing member at the lower end, a bracket engaging said bearing member for rotatably mounting said frame, a shaft extending through said bearing member, a coil spring having one end connected with said shaft and the other end with said bracket, a condenser plate rigidly secured to said shaft, an arm rigidly secured to said frame, means for connecting said plate and arm so that the plate will have a limited rotary movement independent of said arm, a second plate connected to but insulated from said frame, said second plate being arranged substantially parallel with said arm, whereby when said magnets are rotated said arm and said second plate will be rotated in a direction for winding said spring, and means for connecting the second plate and the first-mentioned plate with opposite terminals of a source of current, whereby when current is being impressed on said plates and said frame is being rotated in a direction for winding said spring, said plates will attract each other so that the first plate will be moved by the second-mentioned plate, said movement continuing until the countertorque of the spring will overcome the torque of the first-mentioned plate, said second plate being positioned to be observed through said top whereby said graduations will indicate the amount of voltage impressed on said plates.

2. An electrostatic voltmeter including a housing having a transparent top, a metal member arranged centrally on said housing formed with a chamber and a radiating flange cemented to said top, a shaft extending into said chamber, a handle rigidly secured to said shaft at one end, a rectangular magnet connected with said shaft at the other end, said magnet being positioned in said chamber but exteriorly of said top, a similarly shaped magnet arranged in said housing near said top, means including a pair of plates connected with the second-mentioned magnet and rotatable therewith, an intermediate plate arranged between the first two plates, means for independently rotatably mounting the intermediate plate, means for connecting the intermediate plate with one of the first mentioned plates, said connection being such as to permit a limited free movement of the intermediate plate, a spring connected with the intermediate plate for resisting rotary motion thereof, means presenting graduations carried by said top whereby the amount of rotary movement of said intermediate plate may be observed, and means for connecting the intermediate plate and one of the first-mentioned plates to one side of a source of electric current and the other of the first-mentioned plates to the other side of the same source.

3. An electrostatic voltmeter including a pair of approximately parallel plates insulated from each other, means for rotatably mounting said plates, a rotatable shaft arranged between said plates and occupying the axis of rotation of said plates, an intermediate plate rigidly secured to said shaft, means for loosely connecting the intermediate plate with one of the first-mentioned plates, said means permitting a limited independent rotary movement of the intermediate plate, a spring connected with said shaft adapted to be brought under tension when all of said plates are rotated in one direction, means for connecting the intermediate plate and one of the first-mentioned plates to one side of a source of electrical current and the other of the first-mentioned plates to the other side of the same source of electrical current so that the intermediate plate will be charged with polarity opposite the polarity of the other of the first-mentioned plates, and a scale indicating the degree of rotary movement of said intermediate plate, said scale being calibrated to indicate volts.

4. An electrostatic voltmeter including a housing, means for connecting a suction pump to the housing to produce a rarefaction in the housing, a pair of condenser plates mounted in the housing and movable about the same axis, means for manually rotating one of said plates, said means including a permanent rectangular magnet mechanically connected to said one plate, a second permanent rectangular magnet positioned exteriorly of said housing with its center in axial alignment with the center of the first-mentioned permanent magnet and a hand-actuated member for rotating the second-mentioned permanent magnet in a plane parallel to the plane of rotation of the first-mentioned permanent magnet, a spring connected to the plate which is not manually actuated, said spring producing a torque opposite to the torque produced by said manual actuation, means for connecting said plates respectively to the opposite terminals of a source of current, whereby said plates will attract each other, and a scale graduated in volts for indicating the amount of rotation of said plates.

5. An electrostatic voltmeter including a housing formed to sustain a rarefaction therein, a manually rotatable plate arranged in said housing, means for manually rotating said manually rotatable plate, said means including a permanent magnet mechanically connected to said manually rotatable plate, a second permanent magnet positioned exteriorly of said housing with its center substantially in alignment with the center of the first-mentioned permanent magnet and a hand actuated member for rotating the second-mentioned permanent magnet in a plane parallel to the plane of rotation of the first-mentioned permanent magnet, an electrically rotatable plate arranged in said housing and positioned to rotate around the same axis as the other plate, a spring connected with the second-mentioned plate for resisting rotation thereof, a conductor ring arranged in said housing, a resilient brush connected with the manually actuated plate, said brush resting on said ring, means for connecting said ring with one side of a source of electric current and means for connecting the other side of the same source of electric current with the second-mentioned plate.

6. An electrostatic voltmeter including a condenser plate, means for rotatably mounting said condenser plate, a spring connected with said means acting to resiliently hold said plate in a given position, a plurality of manually actuated plates, means for supporting said plates so that they will rotate simultaneously around the same axis as the first-mentioned plate, a resilient contact brush extending from each of said last-mentioned plates, a conductor ring engaging each of said brushes, means for connecting the first-mentioned plate to one side of a source of electric current, means for connecting said rings to the other side of said source of electric current, said means including a separate switch for each of said rings so that one or any number of said second-mentioned plates may have a charge impressed thereon, a manually actuated structure for rotating said plurality of plates, and means loosely connected with the first-mentioned plate acting to prevent the same from touching any of said plurality of plates, and a scale graduated in volts indicating the annular movement of the first-mentioned plate.

FRANCIS HENRY NADIG.
JACOB LLOYD BOHN.